United States Patent
Krishnamoorthy et al.

(10) Patent No.: US 11,704,096 B2
(45) Date of Patent: Jul. 18, 2023

(54) MONITORING APPLICATION CODE USAGE FOR IMPROVED IMPLEMENTATION OF REUSABLE CODE

(71) Applicant: Bank of America Corporation, Charlotte, NC (US)

(72) Inventors: Madhusudhanan Krishnamoorthy, Chennai (IN); Shadab Bubere, Bhiwandi (IN); Vaasudevan Sundaram, Chennai (IN); Samrat Bhasin, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 56 days.

(21) Appl. No.: 17/399,860

(22) Filed: Aug. 11, 2021

(65) Prior Publication Data

US 2023/0049596 A1     Feb. 16, 2023

(51) Int. Cl.
| | | |
|---|---|---|
| G06F 8/36 | (2018.01) | |
| G06F 8/77 | (2018.01) | |
| G06F 8/71 | (2018.01) | |
| G06F 8/72 | (2018.01) | |

(52) U.S. Cl.
CPC .............. *G06F 8/36* (2013.01); *G06F 8/71* (2013.01); *G06F 8/72* (2013.01); *G06F 8/77* (2013.01)

(58) Field of Classification Search
None
See application file for complete search history.

(56) References Cited

U.S. PATENT DOCUMENTS

| | | | |
|---|---|---|---|
| 5,864,862 A | 1/1999 | Kriens et al. | |
| 6,226,792 B1 | 5/2001 | Goiffon et al. | |
| 7,051,299 B2 | 5/2006 | Chadha et al. | |
| 7,072,810 B2 | 7/2006 | Ramanathan et al. | |
| 7,369,975 B2 | 5/2008 | Ramanathan et al. | |
| 8,135,757 B2 | 3/2012 | Mazo | |
| 8,706,979 B2 | 4/2014 | Gabor | |
| 8,756,258 B2 | 6/2014 | Mazo | |
| 9,199,172 B2 | 12/2015 | Bokelberg et al. | |
| 9,311,213 B2 | 4/2016 | Seto et al. | |
| 10,423,675 B2 | 9/2019 | Daas et al. | |
| 10,440,132 B2 * | 10/2019 | Stickle ................ | G06F 11/3003 |
| 10,885,256 B1 | 1/2021 | Lei et al. | |
| 10,901,882 B1 * | 1/2021 | Mukhopadhyay .... | G06F 11/302 |
| 10,936,542 B2 * | 3/2021 | Kothari ................. | G06F 16/284 |
| 11,061,668 B2 | 7/2021 | Harter et al. | |

(Continued)

OTHER PUBLICATIONS

Mahmoud, "Supporting requirements to code traceability through refactoring", 2013, Springer-Verlag (Year: 2013).*

(Continued)

*Primary Examiner* — Hossain M Morshed

(57) ABSTRACT

A code tracking system monitors usage of application code executed by one or more computing devices. Characteristics of the usage of the application code are determined. Using the characteristics of the usage of the application code, a modification to an entry of application code executed by the one or more computing devices is detected. The detected modification to the entry of application code is communicated to a code management system. The code management system presents the modification to the entry of the application code to a user of the code management system.

20 Claims, 4 Drawing Sheets

(56) References Cited

U.S. PATENT DOCUMENTS

| | | | |
|---|---|---|---|
| 11,275,579 B2* | 3/2022 | Ramachandra | G06F 8/36 |
| 2002/0186248 A1 | 12/2002 | Ramanathan et al. | |
| 2003/0130961 A1 | 7/2003 | Moret De Rocheprise | |
| 2003/0200532 A1* | 10/2003 | Gensel | G06F 8/71 |
| | | | 717/115 |
| 2005/0022212 A1 | 1/2005 | Bowen | |
| 2005/0028035 A1 | 2/2005 | Chadha et al. | |
| 2006/0142989 A1 | 6/2006 | Ramanathan et al. | |
| 2006/0218535 A1* | 9/2006 | Delmonte | G06F 11/3471 |
| | | | 717/127 |
| 2006/0271493 A1 | 11/2006 | Stefik et al. | |
| 2009/0172314 A1* | 7/2009 | Gabor | G06F 12/0888 |
| | | | 711/159 |
| 2009/0204946 A1* | 8/2009 | Fienblit | G06F 8/71 |
| | | | 717/124 |
| 2010/0318574 A1 | 12/2010 | Mazo | |
| 2012/0124101 A1 | 5/2012 | Mazo | |
| 2012/0191227 A1 | 7/2012 | Bokelberg et al. | |
| 2015/0066869 A1* | 3/2015 | Seto | G06F 21/31 |
| | | | 707/688 |
| 2016/0019047 A1 | 1/2016 | Kieffer | |
| 2017/0220681 A1 | 8/2017 | Daas et al. | |
| 2018/0039506 A1* | 2/2018 | Wagner | G06F 9/45558 |
| 2018/0060047 A1 | 3/2018 | Dow et al. | |
| 2018/0067733 A1 | 3/2018 | Dain | |
| 2018/0121320 A1 | 5/2018 | Dolby et al. | |
| 2018/0188900 A1* | 7/2018 | Gupta | G09G 5/32 |
| 2018/0329704 A1 | 11/2018 | Laredo et al. | |
| 2018/0329705 A1 | 11/2018 | Laredo et al. | |
| 2019/0347190 A1 | 11/2019 | Singh | |
| 2020/0004519 A1* | 1/2020 | Ryall | G06F 8/71 |
| 2020/0045163 A1* | 2/2020 | Hwang | H04M 1/72451 |
| 2020/0065092 A1 | 2/2020 | Harter et al. | |
| 2020/0125362 A1 | 4/2020 | Laredo et al. | |
| 2020/0278850 A1 | 9/2020 | Couillard et al. | |
| 2020/0302521 A1* | 9/2020 | Wernikoff | G06Q 40/00 |
| 2021/0026949 A1* | 1/2021 | Korotaev | G06F 21/577 |
| 2021/0089295 A1 | 3/2021 | Hart et al. | |
| 2021/0141718 A1* | 5/2021 | Sandhu | G06F 8/60 |
| 2021/0377114 A1* | 12/2021 | Nelson | H04L 41/145 |

OTHER PUBLICATIONS

Krishnamoorthy, M. et al., "Reusable Code Management for Improved Deployment of Application Code," U.S. Appl. No. 17/399,772, filed Aug. 11, 2021, 37 pages.

* cited by examiner

MONITORING APPLICATION CODE USAGE FOR IMPROVED IMPLEMENTATION OF REUSABLE CODE

TECHNICAL FIELD

The present disclosure relates generally to managing application code. More particularly, in certain embodiments, the present disclosure is related to monitoring application code usage for improved implementation of reusable code.

BACKGROUND

Programming code is presented in a human-readable programming language (e.g., as opposed to binary machine code). A given program, or computing task, may be implemented using the code. Specialized training and knowledge of a code's programming language is generally required to both understand the function(s) of a given piece of code and to create new code using the original code as a starting point to perform a desired task.

SUMMARY

This disclosure encompasses the recognition of previously unidentified problems associated with previous technology used to reuse application code. For instance, previous approaches to reusing application code generally relied on developers' attempts to understand and repurpose stored code, which may be poorly annotated and/or optimized for a different use than that of interest to the developers. For example, different developers often have different approaches to writing code, resulting in code entries being stored for reuse in a form which, in the absence of improvements like those described in this disclosure, is of limited use to others. Using previous technology, multiple copies of the same or similar source code may be stored that perform the same function, resulting in inefficient use of computing resources. Previous technology fails to provide any indication of which code entries for a particular purpose may be the most effective (e.g., based on previous usage) and provide the best user experience. Moreover, using previous technology, developers that provide code for reuse by others are not provided tools for improving their code over time.

Certain embodiments of this disclosure provide unique solutions to technical problems of previous technology, including those described above, by providing the practical application of code management and tracking systems. For example, the disclosed systems provide several technical advantages which may include 1) the ability to identify and implement reusable code for a user's desired purpose via an intuitive and user-friendly graphical user interface; 2) the ability to track changes to reusable code that has been deployed such that any improvements to the code can be captured and provided to other deployments of the code; and 3) a platform that motivates developers to provide and maintain high quality code for reuse by others. As such, this disclosure may improve the function of computer systems used for storing, deploying, and updating application code for reuse by a number of users.

In some embodiments, the systems, methods, and devices described in this disclosure may particularly be integrated into a practical application of a code management system that provides a user interface that allows a user to select requested features of desired application code and/or provide a request for code and receive a corresponding set of one or more candidate code entries. A selected code entry may be stored to the user's device. In some cases, a value may be associated with the code entries and presented alongside the candidate entries. The value may correspond to an amount of resources needed to implement the code, such that the user may more effectively select code that meets both coding needs and any resource constraints.

In some embodiments, the systems, methods, and devices described in this disclosure may particularly be integrated into a practical application of a code execution tracking system that monitors the usage of reusable code that is deployed. The code execution tracking system may detect that deployed code is changed. The changed code may be presented to the original code developer, such that any improvements can be implemented in the centrally stored code that is offered as reusable code to other users. The code execution tracking system may use the monitored code usage to determine a value of the code (e.g., a metric corresponding to how many users are using the code, how many work functions are performed with the code, etc.). The code value may be used to appropriately reward the code's developer(s) and/or update the amount or number of resources needed to use the code.

Certain embodiments of this disclosure may include some, all, or none of these advantages. These advantages and other features will be more clearly understood from the following detailed description taken in conjunction with the accompanying drawings and claims.

In an embodiment, a system includes a code repository configured to store application code. Each entry of application code includes instructions in a programming language for performing a computing task. For each entry of application code, the code repository also includes metadata indicating a purpose associated with the computing task performed by the application code. A code management system includes a memory operable to store instructions for presenting a graphical user interface to a user. The code management system includes a processor communicatively coupled to the memory. The code management system presents the graphical user interface, which includes fields for selection of requested features of application code requested by the user. The code management system determines, based at least in part on the requested features selected in the graphical user interface, code requirements that include attributes of application code needed to achieve the requested features. The code management system determines, based at least in part on the determined code requirements and the metadata for each entry of application code stored in the code repository, one or more candidate application code entries from the code repository. The code management system presents the candidate application code entries for user selection in the graphical user interface. After receipt of a user selection of a selected application code, the selected application code is provided to a computing device associated with the user.

In yet another embodiment, a system includes one or more computing devices executing application code that includes instructions in a programming language for performing a computing task. A code tracking system monitors usage of the application code executed by the one or more computing devices. Characteristics of the usage of the application code are determined based on the monitored usage of the application code. The characteristics include one or more of a frequency of usage of the application code, a number of users of the application code, a record of computing tasks performed using the application code. Using the characteristics of the usage of the application code, a modification to an entry of application code executed by the one or more computing devices is detected. The detected modification to the entry of application code is communicated to a code management system. The code management system presents the modification to the entry of the application code to a user of the code management system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for reliably reusing application code. The disclosed systems, described with respect to the examples of FIGS. 1-4 below, provide solutions to the problems of previous technology. The disclosed systems may store reusable code more efficiently, such that unnecessary resources are not wasted for repeated code for the same the functions or for functions not requested by users and such that that the most effective code is reused more frequently. The disclosed systems may facilitate updating stored code for improved reusability, such that modifications leading to improvements can be used to update deployed instances of the code when appropriate. The disclosed systems may further motivate developers of code to generate code that is more readily reusable by tracking how reusable code is used by other users.

As used in this disclosure, a natural language corresponds to a an established language (e.g., English) used for human-to-human communication. As used in the disclosure, a programming language refers to a formalized text-based language which includes instructions for implementing functions and/or tasks using a computer. Examples of programming languages include C, C++, C #, Python, JAVA, HTML, and the like. These programming languages are provided for example only. This disclosure contemplates the use of any programming language.

Code Management System for Improved Code Deployment

Figure 1:
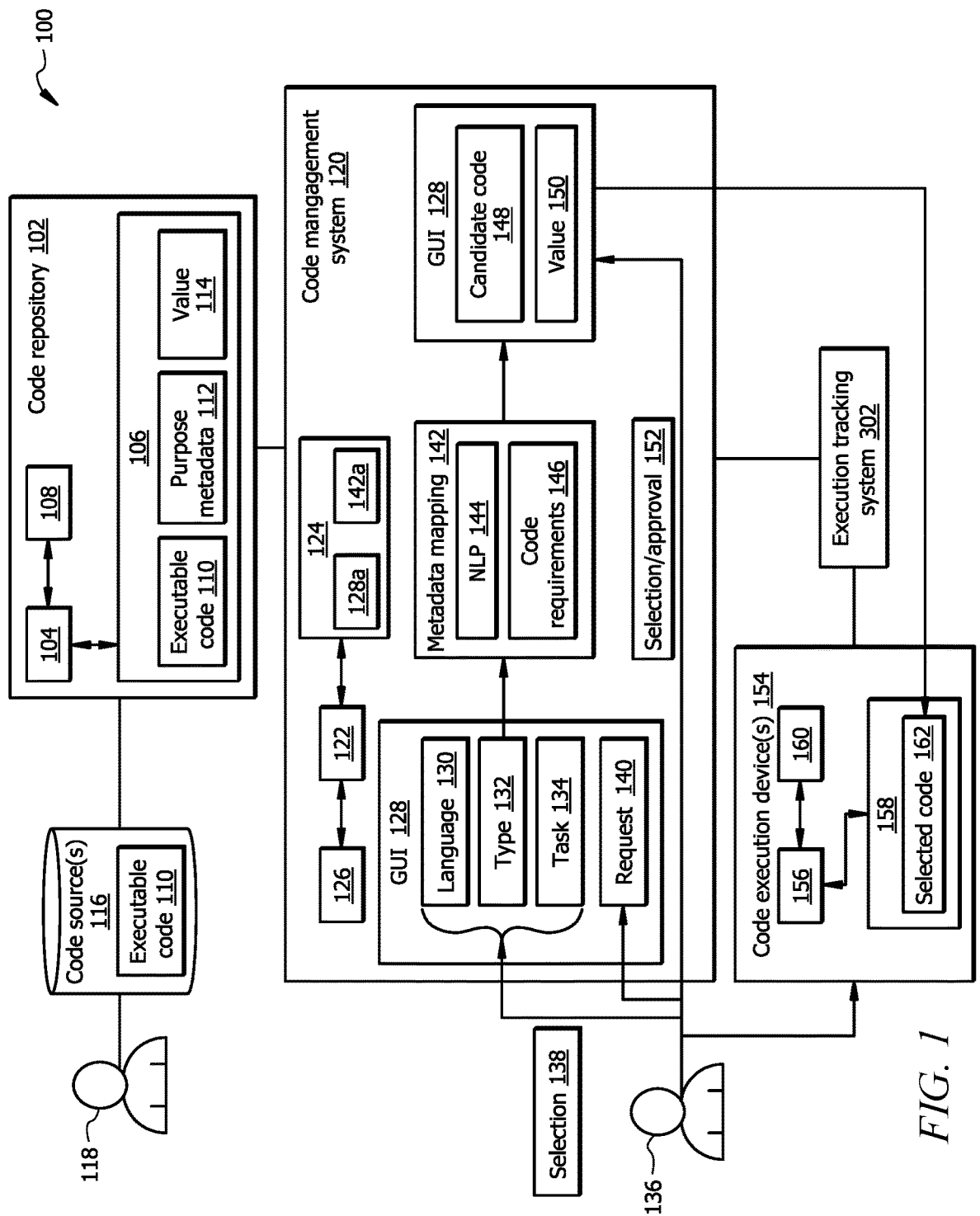
FIG. 1 is a schematic diagram of an example system for reusable code management and deployment.
Figure 3:
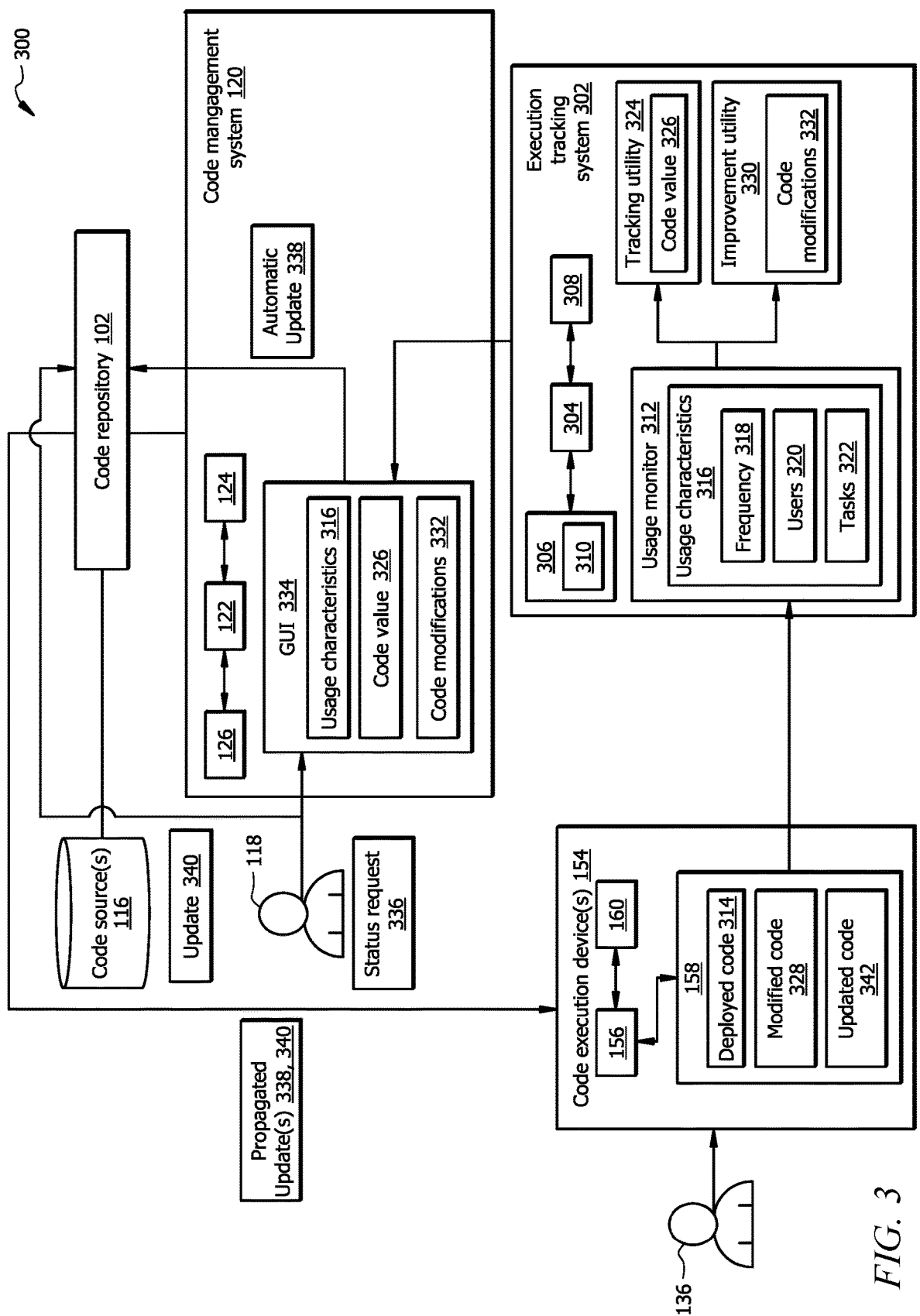
FIG. 3 is a schematic diagram of an example system for monitoring the use of deployed reusable code and improving its implementation.

FIG. 1 is a schematic diagram of an example system 100 for code management and deployment. The system 100 includes a code repository 102, code sources 116, code management system 120, one or more code execution devices 154, and an optional execution tracking system 302 (see FIG. 3). The code management system 120 of system 100 is generally configured to determine one or more entries of candidate code 148 that meet the needs of a user 136 to perform a desired task (e.g., that correspond to needs indicated in a request 140 and/or entered via entry/selection 138 of code features 130, 132, 134 in a graphical user interface (GUI) 128). The user 136 can then select an entry of candidate code 148 (e.g., via selection/approval 152), and the selected code 162 is automatically deployed to a code execution device 154 associated with the user 136 (e.g., such that the user 136 can use the selected code 162 for some purpose). After the selected code 162 is deployed, the execution tracking system 302 may monitor how the selected code 162 (or other deployed code) is used. FIG. 3 illustrates the structure and function of an example execution tracking system 302 in greater detail.

The code repository 102 is generally a data store, or database, configured to store executable code 110 along with corresponding purpose metadata 112 and values 114. The code repository 102 generally includes a processor 104, memory 106, and network interface 108. The processor 104 of the code repository 102 includes one or more processors. The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The processor 104 is communicatively coupled to and in signal communication with the memory 106 and network interface 108. The one or more processors are configured to process data and may be implemented in hardware and/or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory 106 and executes them by directing the coordinated operations of the ALU, registers and other components.

The memory 106 of the code repository 102 is operable to store executable code 110, purpose metadata 112, values 114, and any data, instructions, logic, rules, or code operable to execute the functions of the code repository 102. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may include read-only memory (ROM), random-access memory (RAM), ternary content-addressable memory (TCAM), dynamic random-access memory (DRAM), and static random-access memory (SRAM).

The network interface 108 of the code repository 102 is configured to enable wired and/or wireless communications. The network interface 108 is configured to communicate data between the code repository 102 and other network devices, systems, or domain(s), such as code sources 116 and the code management system 120. The network interface 108 is an electronic circuit that is configured to enable communications between devices. For example, the network interface 108 may include one or more serial ports (e.g., USB ports or the like) and/or parallel ports (e.g., any type of multi-pin port) for facilitating this communication. As a further example, the network interface 108 may include a WIFI interface, a local area network (LAN) interface, a wide area network (WAN) interface, a modem, a switch, or a router. The processor 104 is configured to send and receive data using the network interface 108. The network interface 108 may be configured to use any suitable type of communication protocol as would be appreciated by one of ordinary skill in the art. The network interface 108 receives executable code 110 from code sources 116 and communicates executable code 110, purpose metadata 112, and values 114 to the code management system 120.

Each entry of executable code 110 stored in the memory 106 generally includes instructions in a programming language for performing one or more computing tasks. The executable code 110 may be obtained from one or more code sources 116, which may include public code repositories (e.g., of open source executable code 110) and/or private code repositories associated with different work groups, or the like, within the organization operating the system 100. As an example, a developer 118 at the organization may generate executable code 110 for a given project or purpose and store the executable code 110 in a data source 116 providing storage for the developers' workgroup, organization, or the like.

The purpose metadata 112 generally indicates an underlying purpose or use of each entry of executable code 110. For example, the purpose metadata 112 may indicate a purpose associated with a computing task performed by the code 110. For instance, purpose metadata 112 may identify a group that commonly uses the code 110, an organization or workgroup in an organization that uses the code 110, types of analyses performed with the code 110, and the like. The purpose metadata 112 may be determined, at least in part, using information provided by the developer 118 at the time the executable code 110 is originally stored at a code source 116 or the code repository 102. In some cases, at least a portion of the purpose metadata 112 is determined by the code repository 102. For example, the code repository 102 may access the executable code 110 and detect functions employed by the executable code 110, a programming language of the executable code 110, and/or explanatory annotations presented in the executable code 110 (e.g., text included in the executable code 110 that is not related to program functionality but instead provides a natural language description of functions of the executable code 110).

The values 114 generally indicate, for each entry of executable code 110, a predefined value associated with the code 110. For example, a value 114 may correspond to an amount of resources (e.g., memory, processing power, network bandwidth, software licenses, etc.) needed to use a corresponding entry of code 110. As another example, a value 114 may correspond to a reward provided to a developer 118 when the code 110 is reused by others.

The code management system 120 is in communication with the code repository 102 and the code execution device(s) 154 (e.g., via network interface 126). The code management system 120 determines one or more entries of candidate code 148 that meet the needs of a user 136 to perform a desired task (e.g., that correspond to needs indicated in a request 140 and/or entered via entry/selection 138 of code features 130, 132, 134 in the GUI 128). The user 136 can then select an entry of candidate code 148 (e.g., via selection/approval 152), and the selected code 162 is automatically deployed to an appropriate device 154 associated with the user 136 (e.g., such that the user 136 can use the selected code 162 for some purpose).

The code management system 120 generally includes a processor 122, memory 124, and network interface 126. The processor 122 of the code management system 120 includes one or more processors. The processor 122 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the memory 124 and network interface 126. The one or more processors are configured to process data and may be implemented in hardware and/or software. For example, the processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory 124 and executes them by directing the coordinated operations of the ALU, registers and other components.

The memory 124 of the code management system 120 is operable to store GUI presentation instructions 128a, metadata mapping instructions 142a, and any data, instructions, logic, rules, or code operable to execute the functions of the code management system 120. The GUI presentation instructions 128a include any code, logic, or rules for presenting the GUI 128 to user 136. The metadata mapping instructions 142a generally includes any code, logic, or rules for performing metadata mapping 142 (described further below). For example, the metadata mapping instructions 142a may include instructions for performing natural language processing (NLP) 144 in order to determine a meaning of a request 140 provided by user 136. The memory 124 includes one or more disks, tape drives, or solid-state drives, and may be used as an over-flow data storage device, to store programs when such programs are selected for execution, and to store instructions and data that are read during program execution. The memory 124 may be volatile or non-volatile and may include read-only memory (ROM), random-access memory (RAM), ternary content-addressable memory (TCAM), dynamic random-access memory (DRAM), and static random-access memory (SRAM).

The network interface 126 of the code management system 120 is configured to enable wired and/or wireless communications. The network interface 126 is configured to communicate data between the code management system 120 and other network devices, systems, or domain(s), such as the code repository 102 and the code execution devices 154. The network interface 126 is an electronic circuit that is configured to enable communications between devices. For example, the network interface 126 may include one or more serial ports (e.g., USB ports or the like) and/or parallel ports (e.g., any type of multi-pin port) for facilitating this communication. As a further example, the network interface 126 may include a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol as would be appreciated by one of ordinary skill in the art. The network interface 126 receives executable code 110, purpose metadata 112, and values 114 from the code repository 102, user inputs to the GUI 128 (e.g., selection 138, request 140, selection/approval 152, etc.), and communicates selected code 162 to the code execution devices 154.

The code management system 120 presents the GUI 128 for viewing by a user 136 that is seeking code 110 to reuse. The GUI 128 may be presented on a display of a device operated by the user 136 (e.g., a code execution device 154), the code management system 120, or another device. The GUI 128 includes fields for entering features 130, 132, 134 that the user 136 requests to be included in the code 110 for which the user 136 is searching. For example, the user 136 may provide a selection 138 of features 130, 132, 134. For example, language feature 130 may correspond to an indication of an application programming language of the code 110 requested by the user 136. Type feature 132 may correspond to an indication of a type of the code 110 requested by the user 136. Task feature 134 may correspond to an indication of a computing task to be performed by the code 110 requested by the user 136. The GUI 128 may include a field for entry of a request 140 from the user 136. The request 140 may be entered in a natural language. As an example, request 140 entered in a corresponding GUI field may indicate further requested features of the code 110 desired by the user 136. As described further below, a request 140 entered in a corresponding GUI field may be used, at least in part, to determine the candidate code 148 that is provided for user selection.

The requested code features (e.g., corresponding to selections 138 of features 130, 132, 134 and/or request 140) that are provided by the user 136 in the GUI 128 are then used to perform metadata mapping 142. Metadata mapping 142 generally involves the determination of code requirements 146, which are the attributes of the code 110 needed to meet the user's needs. The code requirements 146 may include required features, properties, and/or abilities of the entries of candidate code 148 that will be presented for user selection. For example, the code requirements 146 may include requirement that candidate code 148 use the programming language indicated in language feature 130, are the same type as indicated by the type feature 132, and/or perform at least the same computing tasks as those indicated by the task feature 134. In cases where a request 140 is provided, metadata mapping 142 may use natural language processing (NLP) 144 (e.g., a natural language processing algorithm) to determine the code requirements 146. For example, the code requirements 146 may be determined based at least in part on the natural language request 140 combined with any features 130, 132, 134 selected in the GUI 128.

The code management system 120 uses the code requirements 146 to determine code 110 that should be presented as candidate code 148 for selection by the user 136. For example, the code management system 120 may determine, based at least in part on the determined code requirements 146 and the purpose metadata 112 of each entry of code 110, one or more entries of stored code 110 that should be included as candidate code 148. For instance, entries of stored code 110 with purpose metadata 112 indicating that the code 110 satisfies the code requirements 146 may be included as candidate code 148.

The code management system 120 present the entries of candidate code 148 for user selection in the GUI 128. For example, a name and/or brief description or view of the candidate code 148 may be provided in the GUI 128 for the user 136 to review prior to providing a selection/approval 152. In some cases, the code management system 120 may also present, in the GUI 128, a predefined value 150 corresponding to each of the presented entries of candidate code 148. The predefined value is generally the value 114 for each entry of stored code 110 that is included as candidate code 148.

The user 136 may provide a selection or approval 152 of one or more of the presented entries of candidate code 148. For example, the user 136 may click on an entry of candidate code 148 to review its use history, programmatic instructions, value 150, and/or the like, and upon determining that the entry of candidate code 148 is appropriate for the user's needs, provide the selection/approval 152 of the candidate code 148. After receipt of the selection/approval 152, the corresponding selected code 162 is provided to a code execution device 154 associated with the user 136. For example, the code management system 120 may automatically cause the selected code 162 to be stored in memory 158 of the user's code execution device 154, as illustrated in the example of FIG. 1.

The code execution device(s) 154 are generally any computing devices operable to receive the selected code 162 and execute the selected code 162 to perform its corresponding functions. For example, each of the code execution device(s) 154 may be a computer, a mobile device, a personal assistant device, or the like. Each code execution device 154 includes a processor 156, memory 158, and network interface 160. The processor 156 of the code execution device(s) 154 includes one or more processors. The processor 156 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 156 may be a programmable logic device, a microcontroller, a microprocessor, or any suitable combination of the preceding. The processor 156 is communicatively coupled to and in signal communication with the memory 158 and network interface 160. The one or more processors are configured to process data and may be implemented in hardware and/or software. For example, the processor 156 may be 8-bit, 16-bit, 32-bit, 64-bit or of any other suitable architecture. The processor 156 may include an arithmetic logic unit (ALU) for performing arithmetic and logic operations, processor registers that supply operands to the ALU and store the results of ALU operations, and a control unit that fetches instructions from memory 158 and executes them by directing the coordinated operations of the ALU, registers and other components.

The memory 158 of the code execution device(s) 154 is operable to store selected code 162, and any data, instructions, logic, rules, or code operable to execute the functions of the code execution device(s) 154. The memory 158 includes one or more disks, tape drives, or solid-state drives, and may be used as an over-flow data storage device, to store programs when such programs are selected for execution, and to store instructions and data that are read during program execution. The memory 158 may be volatile or non-volatile and may include read-only memory (ROM), random-access memory (RAM), ternary content-addressable memory (TCAM), dynamic random-access memory (DRAM), and static random-access memory (SRAM).

The network interface 160 of the code execution device(s) 154 is configured to enable wired and/or wireless communications. The network interface 160 is configured to communicate data between the code execution device(s) 154 and other network devices, systems, or domain(s), such as the code management system 120 and the execution tracking system 302. The network interface 160 is an electronic circuit that is configured to enable communications between devices. For example, the network interface 160 may include one or more serial ports (e.g., USB ports or the like) and/or parallel ports (e.g., any type of multi-pin port) for facilitating this communication. As a further example, the network interface 160 may include a WIFI interface, a local area network (LAN) interface, a wide area network (WAN) interface, a modem, a switch, or a router. The processor 156 is configured to send and receive data using the network interface 160. The network interface 160 may be configured to use any suitable type of communication protocol as would be appreciated by one of ordinary skill in the art. The network interface 160 receives selected code 162 and provides information to the execution tracking system 302 (see FIGS. 3 and 4 and corresponding description below).

In some embodiments, the system 100 includes an execution tracking system 302 which monitors usage of the selected code 162 after it is deployed to the code execution device(s) 154. Details of the configuration and operation of an example execution tracking system 302 are provided with respect to FIGS. 3 and 4 below. As a brief example, the execution tracking system 302 may detect modifications to the selected code 162 after it is provided to the code execution device(s) associated with the user 136. These changes may be used to improve the executable code 110 stored in the code repository 102 and, in some cases, automatically provide improved code 110 to other code execution device(s) 154, such that the most up-to-date or optimized code 110 is efficiently deployed.

In an example operation of the system 100, a developer 118 stores executable code 110 in a code source 116, such as a repository operated by the developer's workgroup. The code repository 102 detects this new executable code 110 and stores a copy of the executable code 110 in its memory 106. The code repository 102 also generates purpose metadata 112 for the code 110. For example, the code repository 102 may access the executable code 110 and detect functions employed by the executable code 110, a programming language of the executable code 110, and/or explanatory annotations presented in the executable code 110 (e.g., text included in the executable code 110 that is not related to program functionality but instead provides a natural language description of functions of the executable code 110) to determine the purpose metadata 112. The code repository 102 may determine a value 114 for the executable code 110. For example, the value 114 may correspond to resources expended to use the code 110 and/or an incentive provided to the developer 118 if the code 110 is reused (e.g., via deployment to one or more of the code execution devices 154).

At some later point in time, a user 136 accesses the GUI 128 presented by the code management system 120 and provides a selection 138 of requested code features 130, 132, 134 and/or a request 140 for code (e.g., in a natural language). The code management system 120 identifies code requirements 146 that correspond to the requested features indicated by the user's selection 138 (e.g., features 130, 132, 134) and/or request 140 (e.g., using NLP 144). The code requirements 146 are mapped, or compared, to the purpose metadata 112 of the stored code 110 to determine if any of the stored code 110 satisfies the code requirements 146. Entries of the stored code 110 that satisfy the code requirements 146 (e.g., or at least a threshold amount of the code requirements 146) may be presented as candidate code 148 in the GUI 128 along with the values 150 corresponding with the values 114 of the code 110 included as candidate code 148.

After receiving a user selection/approval 152 of an entry of candidate code 148, the candidate code 148 is provided to (e.g., installed or stored in memory 158 of) a code execution device 154 associated with the user 136. The user 136 can then execute and/or modify the selected code 162 as needed for their purpose. As such, the code management system 120 provides the practical application of improving the reuse of stored code 110.

In some cases, the execution tracking system 302 may monitor how the selected code 162 is used and/or changed over time. For example, usage of the selected code 162 may be used to update the values 114 of stored code 110 corresponding to the selected code 162. For example, a value 114 may be increased for stored code 110 that has a higher usage when deployed in the code execution devices 154. As another example, changes to the selected code 162 may be incorporated into the corresponding stored code 110 if the changes are beneficial for functionality, efficiencies, reliability, etc. If such a change is made, the updated stored code 110 may be automatically provided to code execution devices 154 that are using the old version of the code 110. This ensures the most up-to-date and/or optimized code 110 is in use. Operations of the execution tracking system 302 are described in greater detail below with respect to FIGS. 3 and 4.

Figure 2:
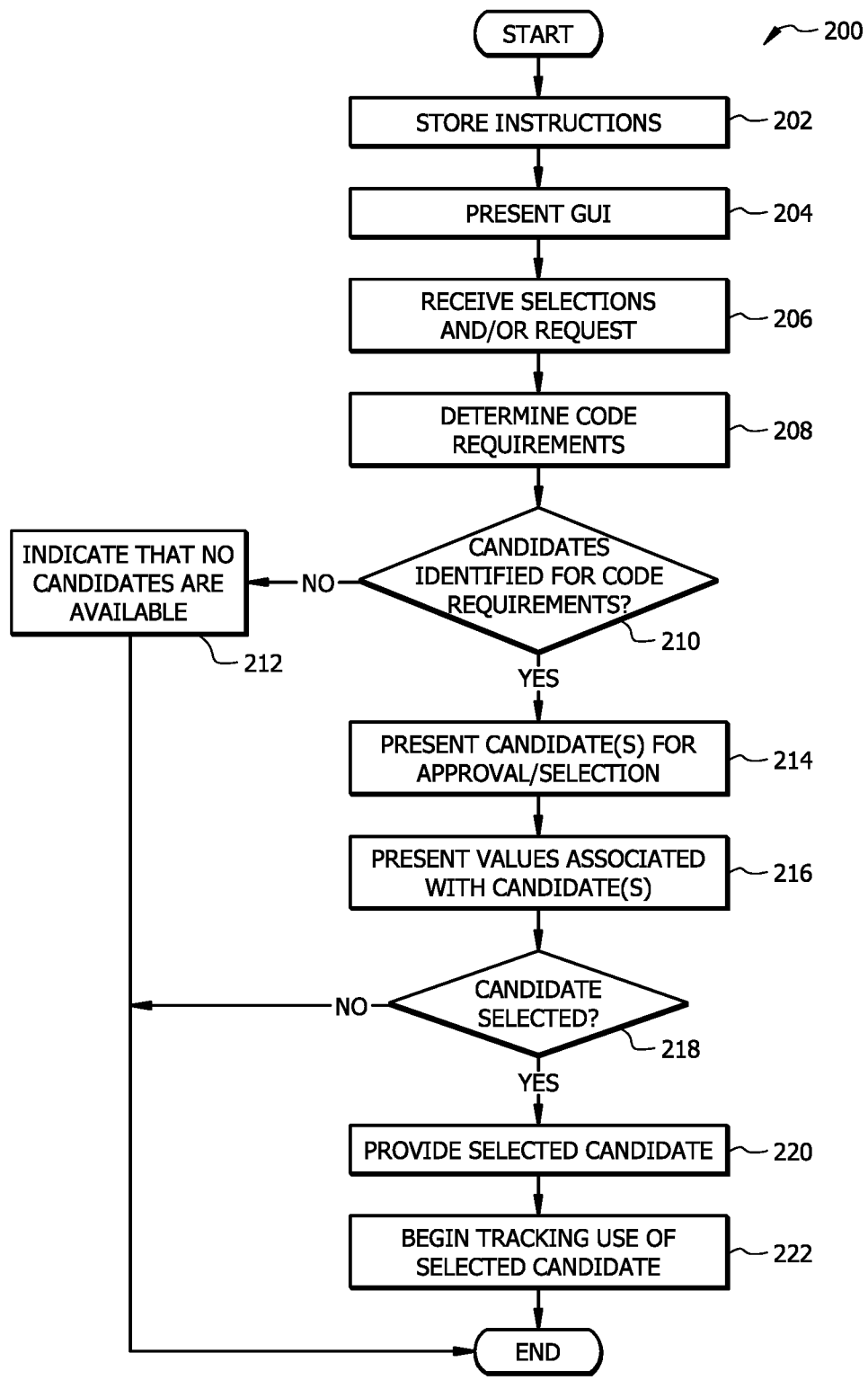
FIG. 2 is a flowchart of a method for operating the system of FIG. 1.

FIG. 2 illustrates an example method 200 of operating the system 100 of FIG. 1. The method 200 may be integrated into the practical application of improving the identification of reusable code 110 for a given user's needs, such that stored code 110 is effectively deployed for use in a more reliable and efficient manner than was possible using previous technology. Method 200 may begin at step 202 where instructions 128a, 142a are stored in the memory 124 of the code management system 120. At step 204, the GUI 128 is presented to a user 136 that is seeking to reuse an entry of executable code 110 stored in the code repository 102. The GUI 128 is described with respect to FIG. 1 above.

At step 206, the code management system 120 receives (e.g., via the GUI 128) selection 138 and/or request 140 corresponding to requested features of code 110 sought by the user 136. For example, the requested features indicated by the selection 138 and/or request 140 may include indication of an application programming language of the code 110 requested by the user 136 via the language feature 130, an indication of a type of the code 110 requested by the user 136 via the type feature 132, and/or an indication of a computing task to be performed by the code 110 requested by the user 136 via the task feature 134.

At step 208, the code management system 120 determines the code requirements 146. For example, the code management system 120 may perform metadata mapping 142 as described above with respect to FIG. 1. In brief, the code management system 120 may use natural language processing 144 to determine requested properties in the user request 140. These properties may be used in combination with those provided via user selection 138 of features 130, 132, 134 in the GUI 128 to determine the code requirements 146.

At step 210, the code management system 120 determines whether candidate code 148 is identified that corresponds to stored code 110 that satisfies the code requirements 146 determined at step 208. The purpose metadata 112 may be used to determine whether various entries of the stored code 110 satisfy the code requirements 146, as described above with respect to FIG. 1. If no candidate code 148 is identified, the code management system 120 may proceed to step 212 and provide an indication that no code 110 is available for the user's needs. In such cases, the code management system 120 may optionally prompt or remind the user 136 to provide any code that is developed by the user 136 for storage in the code repository 102, such that reusable code 110 will become available for this purpose that is currently not covered by the available collection of stored code 110. Otherwise, if at least one entry of candidate code 148 is identified at step 210, the code management system 120 proceeds to step 214.

At step 214, the code management system 120 presents the candidate code 148 determined at step 210 for presentation to the user 136. At step 216, values 150 corresponding to the entries of candidate code 148 may be presented. As described above with respect to FIG. 1, the values 150 may correspond to an amount of resources required to use the candidate code 148. Through presentation of values 150, a user 136 can make a more informed selection of candidate code 148 that matches with their available resources.

At step 218, the code management system 120 determines whether a selection/approval 152 of an entry of candidate code 148 is received. Is a selection/approval 152 is not received, the code management system 120 eventually ends the method 200 (e.g., after waiting a predefined period of time for a user selection/approval 152). Otherwise, if a user selection/approval 152 is received, the code management system 120 proceeds to step 220.

At step 220, the code management system 120 provides the candidate code 148 selected at step 218 to a code execution device 154 associated with the user 136. For example, the selected code 162 may be installed on or stored in memory 158 of the code execution device 154. At step 222, the execution tracking system 302 may begin tracking usage and/or changes to the selected code 162, as described in greater detail with respect to FIGS. 3 and 4 below.

Code Tracking for Continuous Code Monitoring and Improvement

FIG. 3 is a schematic diagram of an example system 300 for tracking usage of and changes to deployed code 314. In some cases, deployed code 314 may be selected code 162 described above with respect to FIGS. 1 and 2. The system 300 may include a code repository 102, code sources 116, and a code management system 120 that are the same as or similar to those described above with respect to FIGS. 1 and 2. The system 300 also includes a code management system 120, one or more code execution devices 154, and an execution tracking system 302. In some embodiments, the code management system 120 and code execution devices 154 are configured to perform the functions described above with respect to FIGS. 1 and 2 in addition to those described below with respect to FIGS. 3 and 4. The execution tracking system 302 generally monitors the usage of deployed code 314. Usage characteristics 316 of the deployed code 314 may be used to identify code modifications 332 that provide performance improvements and/or adjusted code values 326 corresponding to resources required to use the deployed code 314. This information from the execution tracking system 302 may be presented to a developer 118 responsible for the deployed code 314 (e.g., that created and/or maintains the deployed code 314). If the code value 326 and/or code modifications 332 are approved by the developer 118, these changes may be made at the code repository 102 via automatic update 338 (e.g., to adjust the code 110, purpose metadata 112, and/or values 114). This update 338 and/or any other update(s) 340 may be automatically propagated to other instances of the deployed code 314 used by other code execution devices 154. This ensures that the most up-to-date and optimized code 110 is able to be efficiently and reliably available to code execution devices 154.

The execution tracking system 302 includes a processor 304, memory 306, and network interface 308. The processor 304 of the execution tracking system 302 includes one or more processors. The processor 304 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 304 may be a programmable logic device, a microcontroller, a microprocessor, or any suitable combination of the preceding. The processor 304 is communicatively coupled to and in signal communication with the memory 306 and network interface 308. The one or more processors are configured to process data and may be implemented in hardware and/or software. For example, the processor 304 may be 8-bit, 16-bit, 32-bit, 64-bit or of any other suitable architecture. The processor 304 may include an arithmetic logic unit (ALU) for performing arithmetic and logic operations, processor registers that supply operands to the ALU and store the results of ALU operations, and a control unit that fetches instructions from memory 306 and executes them by directing the coordinated operations of the ALU, registers and other components.

The memory 306 of the execution tracking system 302 is operable to store instructions 310 that include any data, logic, rules, or code operable to execute the functions of the execution tracking system 302. The memory 306 includes one or more disks, tape drives, or solid-state drives, and may be used as an over-flow data storage device, to store programs when such programs are selected for execution, and to store instructions and data that are read during program execution. The memory 306 may be volatile or non-volatile and may include read-only memory (ROM), random-access memory (RAM), ternary content-addressable memory (TCAM), dynamic random-access memory (DRAM), and static random-access memory (SRAM).

The network interface 308 of the execution tracking system 302 is configured to enable wired and/or wireless communications. The network interface 308 is configured to communicate data between the execution tracking system 302 and other network devices, systems, or domain(s), such as the code management system 120, code execution device(s) 154, and code repository 102. The network interface 308 is an electronic circuit that is configured to enable communications between devices. For example, the network interface 308 may include one or more serial ports (e.g., USB ports or the like) and/or parallel ports (e.g., any type of multi-pin port) for facilitating this communication. As a further example, the network interface 308 may include a WIFI interface, a local area network (LAN) interface, a wide area network (WAN) interface, a modem, a switch, or a router. The processor 304 is configured to send and receive data using the network interface 308. The network interface 308 may be configured to use any suitable type of communication protocol as would be appreciated by one of ordinary skill in the art. The network interface 308 receives information about deployed code 314, modified code 328, and/or updated code 342 and communicates usage characteristics 316, code values 326, and code modifications 332, as described in greater detail below.

For the purposes of illustrating operation of the execution tracking system 302, different functions are illustrated as being performed by a usage monitor 312, tracking utility 324, and improvement utility 330. It should be understood that the functions and operations of each of these components are performed by the processor 304 executing instructions 310 stored in the memory 306. Operations involving communication with other systems or devices may be performed using the network interface 308.

The usage monitor 312 monitors deployed code 314 and determines usage characteristics 316 of the deployed code 314. The deployed code 314 is generally any programming code executed by a code execution device 154. Generally, deployed code 314 that is monitored by the execution tracking system 302 corresponds to an entry of code 110 stored in the code repository 102. The usage characteristics 316 may include a frequency 318 of usage of the deployed code 314 (e.g., how often the deployed code 314 is used in a given period of time), user characteristics 320 of users 136 of the deployed code 314 (e.g., a number of users 136 of the deployed code 314), a record of computing tasks 322 performed using the deployed code 314 (e.g., types of work, types of analyses, etc. performed using the deployed code 314).

The tracking utility 324 may use the usage characteristics 316 to determine a code value 326 for the deployed code 314. The code value 326 may be a metric of usage of the deployed code 314. For example, deployed code 314 that, based on the usage characteristics 316, requires a relatively large number or amount of resources (e.g., usage of processor 156, memory 158, and/or network interface 160) may have an increased code value 326. In some cases, the code value 326 may correspond to a metric for how reusable the deployed code 314 is based on the usage characteristics. For example, deployed code 314 with a high frequency 318 of use, a large number of users 320, and/or that is used for a large number of tasks 322 (e.g., or for critical tasks 322) may be determined to have an increased code value 326. The code value 326 may be used to adjust how a developer 118 is rewarded for creating and/or maintaining stored code 110 that corresponds to the deployed code 314.

The execution tracking system 302 may communicate the determined code value 326, alone or together with at least a portion of the usage characteristics 316, for presentation to the developer 118. For example, the code value 326 and/or usage characteristics 316 may be provided to the code management system 120. The code management system 120 may present a GUI 334 that provides a presentation of the code value 326 and/or usage characteristics 316. The GUI presentation instructions 128a described with respect to FIG. 1 above may include instructions for presenting the GUI 334 illustrated in FIG. 3. In some cases, the code value 326 and/or usage characteristics 316 for a given entry of deployed code 314 that was created and/or is maintained by the developer 118 may be presented in response to a status request 336 provided by the developer 118. The memory 124 of the code management system 120 may store the code value 326 and/or usage characteristics 316. If the code value 326 is changed from an original value 114 for the entry of stored code 110 that corresponds to the deployed code 314, the code management system 120 may provide an automatic update 338 that changes the value 114 to the determined code value 326. The updated value 114 may provide future users 136 a more accurate and up-to-date metric of the resources needed to use the stored code 110.

In some cases, a user 136 may make one or more changes to deployed code 314, thereby generating modified code 328. The execution tracking system 302 can detect such changes and use the improvement utility 330 to determine code modifications 332 that were made to arrive at the modified code 328 from the original deployed code 314. For example, the improvement utility 330 may detect, using the usage characteristics 316, a code modification 332 to a given entry of deployed code 314. The code modification 332 may correspond to a change to the instructions in the programming language of the entry of the deployed code 314. For example, the detected change may alter at least a portion of a computing task performed by the entry of the deployed code 314.

The execution tracking system 302 may communicate the detected code modification 332, alone or together with at least a portion of the usage characteristics 316 for presentation to the developer 118. For example, the code modification 332 and/or usage characteristics 316 may be provided to the code management system 120. The code management system 120 may present the GUI 334 that provides a presentation of the code modifications 332 and/or usage characteristics 316. In some cases, the code modifications 332 and/or usage characteristics 316 for a given entry of deployed code 314 that was created and/or is maintained by the developer 118 may be presented in response to a status request 336 provided by the developer 118. The memory 124 may store the code modifications 332.

In some cases, the code management system 120 may automatically update the code 110 stored in the code repository 102 that corresponds to the entry of deployed code 314 that was modified. For example, an entry of stored code 110 corresponding to an original deployed code 314 may be changed to be the same as modified code 328. The developer 118 may indicate an approval of the modified code 328 if the changes introduced by user 136 improve functioning of the original deployed code 314. As such, continuous improvements to the stored code 110 can be achieved in the system 300 of FIG. 3. The developer 118 can also view the code modifications 332 and provide their own update 340 to the stored code 110 if desired. After stored code 110 is updated via update 338 and/or update 340, the update(s) 338, 340 may be automatically propagated to the other code execution devices 154 to replace deployed code 314 (e.g., such that stored copies of a previous version of the deployed code 314 are replaced by the updated code 110). As such, the improved code 110 can be efficiently and reliably provided to other code execution devices 154, such that improvements are realized by others.

Figure 4:
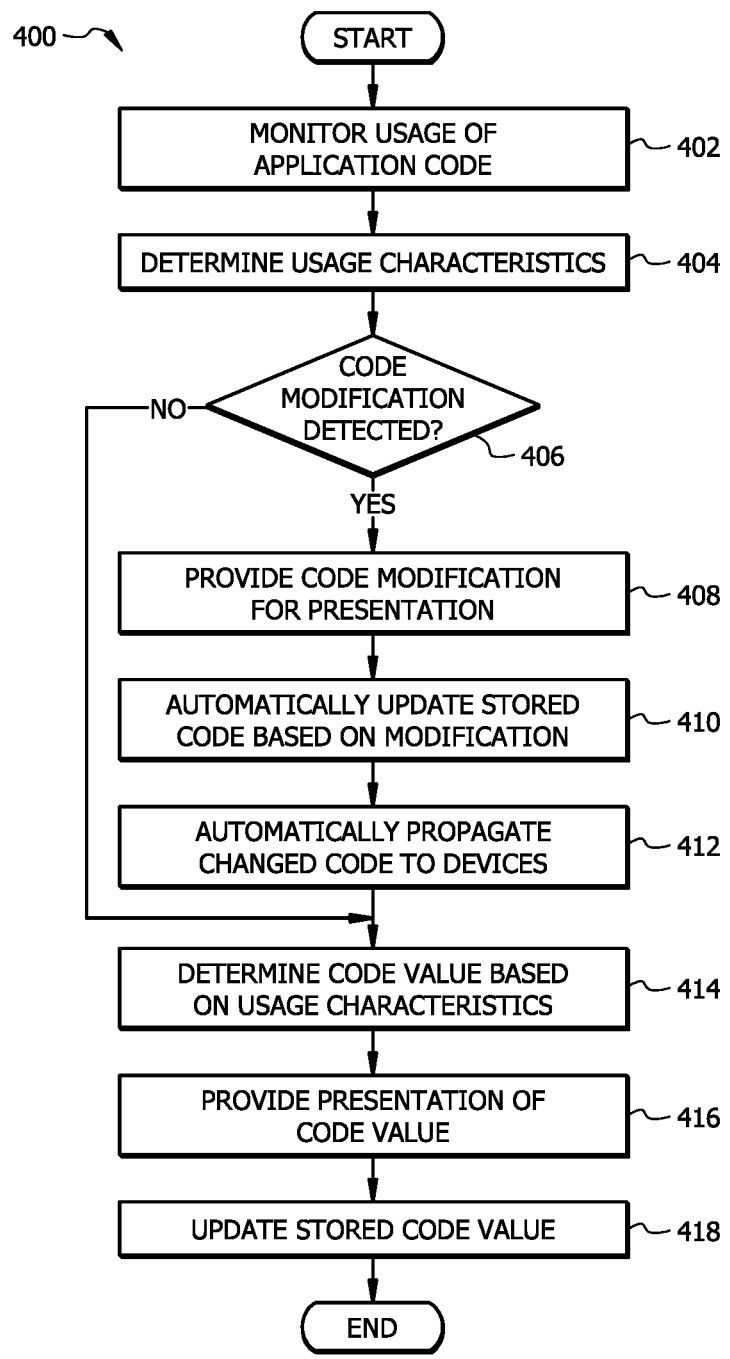
FIG. 4 is a flowchart of a method for operating the system of FIG. 3.

FIG. 4 illustrates an example method 400 of operating the system 300 of FIG. 1. The method 400 may be integrated into the practical application of improving the stored code 110, such that stored code 110 is efficiently and reliably updated based on how corresponding deployed code 314 is used. Method 400 may begin at step 402 where the execution tracking system 302 monitors usage of deployed code 314. For example, the execution tracking system 302 may detect when each instance of deployed code 314 is executed and a usage context of the deployed code 314 (e.g., which organizational unit, user 136, or the like is using the deployed code 314).

At step 404, the execution tracking system 302 determines usage characteristics 316 of the deployed code 314. The usage characteristics 316 may include a frequency 318 of usage of the deployed code 314 (e.g., how often the deployed code 314 is used in a given period of time), user characteristics 320 of users 136 of the deployed code 314 (e.g., a number of users 136 of the deployed code 314), a record of computing tasks 322 performed using the deployed code 314 (e.g., types of work, types of analyses, etc. performed using the deployed code 314).

At step 406, the execution tracking system 302 determines whether a code modification 332 is detected. For example, the improvement utility 330 may detect, using the usage characteristics 316, a code modification 332 to a given entry of deployed code 314. The code modification 332 may correspond to a change to the instructions in the programming language of the entry of the deployed code 314, as described with respect to FIG. 3 above. If a code modification 332 is not detected, the execution tracking system 302 proceeds to step 414. However, if a code modification 332 is detected (e.g., if modified code 328 is detected), the execution tracking system 302 proceeds to step 408.

At step 408, the code modification 332 is provided for presentation. For example, the execution tracking system 302 may provide the code modification 332 to the code management system 120, which uses GUI 334 to present the code modification 332 to developer 118, as described with respect to FIG. 3 above.

At step 410, stored code 110 corresponding to the deployed code 314 that was modified is automatically updated (e.g., by replacing the stored code 110 with the modified code 328). In some cases, the developer may provide an update 340, such that the updated stored code 110 is not necessarily identical to the modified code 328 but still includes at least a portion of improvements that appear in the modified code 328.

At step 412, the updated stored code 110 from step 410 is automatically propagated to the code execution devices 154. For example, updated stored code 110 may be automatically propagated to the other code execution devices 154 to replace deployed code 314 (e.g., such that stored copies of a previous version of the deployed code 314 are replaced by the updated code 110). As such, the improved code 110 can be efficiently and reliably provided to other code execution devices 154, as described above with respect to FIG. 3.

At step 414, a code value 326 may be determined for an entry of deployed code 314. The code value 326 may be determined using the usage characteristics 316. For example, the code value 326 may be determined as a value that is scaled according to the frequency 318 of usage of deployed code, user characteristics 320 associated with the deployed code 314, and/or tasks 322 performed using the deployed code 314. The code value 326 is generally a metric of usage of the deployed code 314 and/or resources needed to execute the deployed code 314.

At step 416, the code value 326 is provided for presentation. For example, the execution tracking system 302 may provide the code value 326 to the code management system 120, which uses GUI 334 to present the code value 326 to developer 118, as described with respect to FIG. 3 above. At step 418, the value 114 for stored code 110 may be updated based on the code value 326. For example, the code management system 120 may provide an automatic update 338 that changes the value 114 to the determined code value 326. The updated value 114 may provide future users 136 a more accurate and up-to-date metric of the resources needed to use the stored code 110.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
one or more computing devices executing an application code comprising instructions in a programming language for performing a computing task; and
a code tracking system comprising:
a first processor configured to:
monitor usage of the application code executed by the one or more computing devices associated with a plurality of users;
determine, based on the monitored usage of the application code, characteristics of the usage of the application code, wherein the characteristics comprise one or more of a frequency of usage of the application code, a number of users of the application code, and a record including a particular type of computing task and a particular type of analysis of the computing task performed using the application code;
detect, using the characteristics of the usage of the application code, a modification to an entry of application code executed by the one or more computing devices, wherein the modification is performed by one or more of the plurality of users and the entry of application code corresponds to storing the application code in a code repository;
determine, based on the particular type of computing task and the particular type of analysis of the characteristics of the usage of the application code, a number of resources required to perform the computing task; and
communicate the detected modification, the number of resources and the characteristics of the usage of the application code to a code management system;
a network interface communicatively coupled to the first processor and configured to communicate, to the code management system, the detected modification to the entry of application code, the number of resources and the characteristics of the usage of the application code; and
the code management system comprising a memory operable to store the communicated modification to the entry of application code, the number of resources and the characteristics of the usage of the application code; and
a second processor communicatively coupled to the memory, the second processor of the code management system configured to:
receive an indication that the modification to the entry of application code improves the computing task; and
in response to receiving the indication that the modification improves the computing task:
store the modification to the entry of application code as an optimized application code in the code repository; and
present the optimized application code to a user of the code management system and the plurality of users of the one or more computing devices.

2. The system of claim 1, wherein the modification to the entry of application code corresponds to a change to the instructions in the programming language of the entry of the application code, wherein the change alters at least a portion of a computing task performed by the entry of the application code.

3. The system of claim 2, wherein the second processor of the code management system is further configured to automatically update, in the code repository storing a reusable application code that is accessible to the plurality of users, an entry of the reusable application code that corresponds to the entry of application code based on the modification to the entry of application code.

4. The system of claim 3, wherein the second processor of the code management system is further configured to automatically provide the updated entry of the reusable application code to other computing devices storing a copy of the updated entry of the application code.

5. The system of claim 1, wherein the first processor of the code tracking system is further configured to determine a value for the first application code, the value corresponding to a metric of the usage of the entry of the application code.

6. The system of claim 5, wherein the second processor of the code management system is further configured to present the determined value of the entry of the application code to the user.

7. The system of claim 1, wherein the user of the code management system is a developer of the entry of the application code.

8. A method comprising:
monitoring usage of an application code executed by one or more computing devices associated with a plurality of users, the application code comprising instructions in a programming language for performing a computing task;
determining, based on the monitored usage of the application code, characteristics of the usage of the application code, wherein the characteristics comprise one or more of a frequency of usage of the application code, a number of users of the application code, and a record including a particular type of computing task and a particular type of analysis of the computing task performed using the application code;
detecting, using the characteristics of the usage of the application code, a modification to an entry of application code executed by the one or more computing devices, wherein the modification is performed by one or more of the plurality of users and the entry of application code corresponds to storing the application code in a code repository;
determining, based on the particular type of computing task and the particular type of analysis of the characteristics of the usage of the application code, a number of resources required to perform the computing task;
communicating the detected modification, the number of resources and the characteristics of the usage of the application code to a code management system;
receiving an indication that the modification to the entry of application code improves the computing task; and
in response to receiving the indication that the modification improves the computing task:
storing the modification to the entry of application code as an optimized application code in the code repository; and
presenting the optimized application code to a user of the code management system and the plurality of users of the one or more computing devices.

9. The method of claim 8, wherein the modification to the entry of application code corresponds to a change to the instructions in the programming language of the entry of the application code, wherein the change alters at least a portion of a computing task performed by the entry of the application code.

10. The method of claim 9, further comprising automatically updating, in the code repository storing a reusable application code that is accessible to the plurality of users, an entry of the reusable application code that corresponds to the entry of application code based on the modification to the entry of application code.

11. The method of claim 10, further comprising automatically providing the updated entry of the reusable application code to other computing devices storing a copy of the updated entry of the application code.

12. The method of claim 8, further comprising determining a value for the first application code, the value corresponding to a metric of the usage of the entry of the application code.

13. The method of claim 12, further comprising presenting the determined value of the entry of the application code to the user.

14. A system comprising:
a code tracking system comprising:
a first processor configured to:
monitor usage of application code executed by one or more computing devices associated with a plurality of users, the application code comprising instructions in a programming language for performing a computing task;
determine, based on the monitored usage of the application code, characteristics of the usage of the application code, wherein the characteristics comprise one or more of a frequency of usage of the application code, a number of users of the application code, and a record including a particular type of computing task and a particular type of analysis of the computing task performed using the application code;
detect, using the characteristics of the usage of the application code, a modification to an entry of application code executed by the one or more computing devices, wherein the modification is performed by one or more of the plurality of users and the entry of application code corresponds to storing the application code in a code repository;
determine, based on the particular type of computing task and the particular type of analysis of the characteristics of the usage of the application code, a number of resources required to perform the computing task; and
communicate the detected modification, the number of resources and the characteristics of the usage of the application code to a code management system;
a network interface communicatively coupled to the processor and configured to communicate, to the code management system, the detected modification to the entry of application code, the number of resources and the characteristics of the usage of the application code; and
the code management system comprising a memory operable to store the communicated modification to the entry of the application code, the number of resources and the characteristics of the usage of the application code; and a second processor communicatively coupled to the memory, the second processor of the code management system configured to:
  receive an indication that the modification to the entry of application code improves the computing task; and
  in response to receiving the indication that the modification improves the computing task:
    store the modification to the entry of application code as an optimized application code in the code repository; and
    present the optimized application code to a user of the code management system and the plurality of users of the one or more computing devices.

15. The system of claim 14, wherein the modification to the entry of application code corresponds to a change to the instructions in the programming language of the entry of the application code, wherein the change alters at least a portion of a computing task performed by the entry of the application code.

16. The system of claim 15, wherein the second processor of the code management system is further configured to automatically update, in the code repository storing a reusable application code that is accessible to the plurality of users, an entry of the reusable application code that corresponds to the entry of application code based on the modification to the entry of application code.

17. The system of claim 16, wherein the second processor of the code management system is further configured to automatically provide the updated entry of the reusable application code to other computing devices storing a copy of the updated entry of the application code.

18. The system of claim 14, wherein the first processor of the code tracking system is further configured to determine a value for the first application code, the value corresponding to a metric of the usage of the entry of the application code.

19. The system of claim 18, wherein the second processor of the code management system is further configured to present the determined value of the entry of the application code to the user.

20. The system of claim 14, wherein the user of the code management system is a developer of the entry of the application code.

* * * * *